(12) United States Patent
Plaehn et al.

(10) Patent No.: US 11,919,498 B2
(45) Date of Patent: Mar. 5, 2024

(54) METHOD FOR DETERMINING UNSTABLE BEHAVIOR OF A TRAILER AND METHOD FOR STABILIZING A TRAILER, AND EVALUATION UNIT AND VEHICLE COMBINATION

(71) Applicant: ZF CV Systems Hannover GmbH, Hannover (DE)

(72) Inventors: Klaus Plaehn, Seelze (DE); Benjamin Bieber, Wedemark (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 476 days.

(21) Appl. No.: 17/197,057

(22) Filed: Mar. 10, 2021

(65) Prior Publication Data
US 2021/0188229 A1 Jun. 24, 2021

Related U.S. Application Data

(63) Continuation of application No. PCT/EP2019/071946, filed on Aug. 15, 2019.

(30) Foreign Application Priority Data

Sep. 12, 2018 (DE) ..................... 10 2018 122 273.4

(51) Int. Cl.
  *B60T 8/17* (2006.01)
  *B60T 7/20* (2006.01)
  *B60T 8/1755* (2006.01)

(52) U.S. Cl.
  CPC .............. *B60T 8/1708* (2013.01); *B60T 7/20* (2013.01); *B60T 8/17551* (2013.01); *B60T 2230/06* (2013.01)

(58) Field of Classification Search
  CPC .. B60T 8/1708; B60T 8/17551; B60T 8/1755; B60T 7/20; B60T 2230/06; B60T 2270/86
  See application file for complete search history.

(56) References Cited

U.S. PATENT DOCUMENTS 5,579,228 A * 11/1996 Kimbrough .............. B60D 1/58
  701/41
5,747,683 A * 5/1998 Gerum .................. B60T 8/1708
  701/72

(Continued)

FOREIGN PATENT DOCUMENTS

DE         10225120 A1     11/2003
DE     102007061836 A1      6/2009

(Continued)

OTHER PUBLICATIONS

Translation of DE 102016105916 A1, cited on IDS and PCT/EP2019/071946. (Year: 2016).*

*Primary Examiner* — Russell Frejd
(74) *Attorney, Agent, or Firm* — LEYDIG, VOIT & MAYER, LTD.

(57) ABSTRACT

A method for determining unstable behavior of a trailer of a vehicle combination, the vehicle combination having N members, one of the members being a tractor vehicle and at least one further member being the trailer, the unstable behavior of the trailer being determined depending on a driving-dynamics actual characteristic variable of the tractor vehicle, includes: determining at least one driving-dynamics actual characteristic variable of the trailer, the at least one driving-dynamics actual characteristic variable characterizing a current driving-dynamics state of the trailer and following from a measurement by at least one sensor in the trailer; and determining at least one driving-dynamics target characteristic variable of the trailer, the at least one driving-dynamics target characteristic variable following from the at (Continued)

least one driving-dynamics actual characteristic variable of the tractor vehicle by using a kinematic model depending on geometric characteristic variables of the vehicle combination.

26 Claims, 3 Drawing Sheets

(56) References Cited

U.S. PATENT DOCUMENTS

| | | |
|---|---|---|
| 9,573,589 B2 | 2/2017 | Tagesson et al. |
| 10,279,803 B2 | 5/2019 | Lavoie et al. |
| 10,766,482 B2 * | 9/2020 | Buchner ................ B60T 8/323 |
| 2009/0119000 A1 * | 5/2009 | Baumann ............... G01M 1/125 |
| | | 701/124 |
| 2009/0228182 A1 * | 9/2009 | Waldbauer ............. B62D 13/00 |
| | | 701/70 |
| 2012/0029782 A1 | 2/2012 | Suda |
| 2014/0005918 A1 | 1/2014 | Qiang |
| 2014/0218506 A1 | 8/2014 | Trombley et al. |
| 2016/0101810 A1 | 4/2016 | Xu et al. |
| 2018/0154888 A1 * | 6/2018 | Buchner .................. B60D 1/30 |

FOREIGN PATENT DOCUMENTS

| | | |
|---|---|---|
| DE | 102015116960 A1 | 4/2016 |
| DE | 102016105916 A1 | 10/2016 |
| EP | 2773544 A1 | 9/2014 |
| EP | 3034373 A1 | 6/2016 |
| WO | WO 2010087022 A1 | 8/2010 |

* cited by examiner

METHOD FOR DETERMINING UNSTABLE BEHAVIOR OF A TRAILER AND METHOD FOR STABILIZING A TRAILER, AND EVALUATION UNIT AND VEHICLE COMBINATION

CROSS-REFERENCE TO PRIOR APPLICATIONS

This application is a continuation of International Patent Application No. PCT/EP2019/071946, filed on Aug. 15, 2019, which claims priority to German Patent Application No. DE 10 2018 122 273.4, filed on Sep. 12, 2018. The entire disclosure of both applications is incorporated by reference herein.

FIELD

The invention relates to a method for determining an unstable behavior of a trailer, in particular of a trailer of a vehicle combination, and to a method for stabilizing a trailer, to an evaluation unit for carrying out the method and to a vehicle combination having at least one trailer.

BACKGROUND

In certain driving situations with a vehicle combination, in particular utility vehicle combination, a towing vehicle or the tractor vehicle and/or the towed vehicle or the trailer can be set into an oscillating movement or fishtailing movement or swerve sideways one time, as a result of which critical driving situations can occur. Oscillation movements of this kind or sideways swerving of this kind can occur, for example, when driving around a bend, during evasion or overtaking maneuvers, on account of wind conditions, or the like. If the vehicle combination is additionally moving on a wet or smooth surface, the oscillation movements or the swerving may be intensified.

In order to be able to respond to unstable driving situations of this kind, assistance systems are known which evaluate driving-dynamics actual characteristic variables of the tractor vehicle and infer oscillation behavior or swerving of the tractor vehicle therefrom and accordingly intervene in the driving process or inform the driver of this. Information about the oscillation behavior or sideways swerving of the trailer is not taken into account or taken into account only very inaccurately in the process since the movement of the trailer itself is not monitored. At best, provision is made to actuate a trailer brake system in order to carry out, for example, anti-jackknife braking or to brake the entire vehicle combination and accordingly to minimize the oscillation behavior or to counteract the swerving. An intervention of this kind can be controlled by means of a controller of a stability system (ESC) in the tractor vehicle which has an evaluation unit for monitoring the actual characteristic variables of the tractor vehicle.

One disadvantage encountered here is that, when determining the oscillation behavior of the vehicle combination or the lateral swerving of the trailer, use is made only of driving-dynamics actual characteristic variables of the tractor vehicle. Deviations in the driving behavior which occur, for example, on account of different loads or weight conditions between the tractor vehicle and the trailer are not taken into account in the process. Accordingly, for example, the situation of the tractor vehicle being much heavier than the trailer and the trailer fishtailing can occur and therefore a certain oscillation behavior of the trailer is present and/or said trailer swerves one time. However, on account of the different weight conditions, the oscillation behavior or the one-time swerving of the trailer is not transferred to the tractor vehicle or is transferred to the tractor vehicle only very slightly, and therefore, under certain circumstances, this is not recognized by the stability system at all, is recognized too late or is recognized to too small an extent. As a result, firstly instabilities can occur in the entire vehicle combination if, for example in the case of excessive oscillation behavior or sideways swerving of the trailer, the tractor vehicle also begins to oscillate or to swerve sideways, but this is then established very late or too late. Secondly, an oscillating or sideways-swerving trailer can also present a hazard to other road users in the surrounding area, in particular if this is not noticed and accordingly not counteracted.

In this respect, WO 2010/087022 describes stability control in which the tractor vehicle actual yaw rate as the measured driving-dynamics actual characteristic variable of the tractor vehicle is compared with the trailer actual yaw rate as the driving-dynamics actual characteristic variable of the trailer. If these deviate from one another by a defined limit value, the brakes are accordingly actuated in order to counteract this deviation. One disadvantage encountered here is that only overshooting of a limit value is monitored and not the precise course or the driving-dynamics behavior of the trailer as part of overshooting of this kind.

Furthermore, U.S. Pat. No. 9,573,589 B2 describes stability control for a vehicle combination comprising a towing vehicle or a tractor vehicle and a towed vehicle or a trailer. Here, provision is made to determine a deceleration factor, which indicates the time delay after which a response of the trailer is to be expected on account of a steering action of the tractor vehicle, by means of a vehicle combination model, not specified in any detail. After measurement of the current tractor vehicle actual yaw rate as the measured driving-dynamics actual characteristic variable of the tractor vehicle, a trailer target yaw rate or reference yaw rate as the driving-dynamics target characteristic variable of the trailer, which indicates on the basis of the vehicle combination model how the trailer should currently respond to the tractor vehicle actual yaw rate, can be determined by means of the deceleration factor. By comparing the reference yaw rate with a current trailer actual yaw rate as the driving-dynamics actual characteristic variable of the trailer, it is possible to infer whether intervention in the brakes and/or the steering of the trailer is required in order to adhere to the reference yaw rate.

In this case, each trailer is separately controlled by means of a controller which has a yaw rate determination unit and in which the vehicle combination model is implemented. Therefore, the tractor vehicle actual yaw rate and, respectively, the trailer actual yaw rate and also the deceleration factor are processed in an evaluation unit in each trailer in order to then determine and adjust the trailer target yaw rate and, respectively, the reference yaw rate.

EP 2 773 544 B1 discloses a comparable method in which, instead of the yaw rate, the lateral acceleration is taken into account as the driving-dynamics characteristic variable. The evaluation and control for the purpose of adhering to a reference lateral acceleration are likewise performed by means of a deceleration factor in a comparable manner to U.S. Pat. No. 9,573,589 B2.

In this case too, the driving dynamics of the trailer are matched to the driving dynamics of the tractor vehicle with a time offset, wherein it is assumed that the trailer approaches the target value in response to corresponding intervention in the driving dynamics. The way in which the time profile of this approach is shaped and whether further instabilities, for example due to a fishtailing movement which occurs or sideways swerving, occur on account of an approach of this kind are not monitored. As a result, increasing oscillation movements of the trailer or sideways swerving may not be identified in good time under certain circumstances since adjustment in the direction of the target value is performed in the case of any deviation.

A further disadvantage encountered with the described methods is that the geometric dimensions or the manner of coupling between the vehicles of the vehicle combination are not adequately taken into account in the comparison between the actual state and the target state. As a result, the respective methods cannot be applied to any desired vehicle combination in a simple manner and without adjustment or have to be correspondingly reprogrammed for each newly assembled vehicle combination.

SUMMARY

In an embodiment, the present invention provides a method for determining unstable behavior of a trailer of a vehicle combination, the vehicle combination having N members, one of the members comprising a tractor vehicle and at least one further member comprising the trailer, the unstable behavior of the trailer being determined depending on a driving-dynamics actual characteristic variable of the tractor vehicle, the method comprising: determining at least one driving-dynamics actual characteristic variable of the trailer, the at least one driving-dynamics actual characteristic variable characterizing a current driving-dynamics state of the trailer and following from a measurement by at least one sensor in the trailer; determining at least one driving-dynamics target characteristic variable of the trailer, the at least one driving-dynamics target characteristic variable following from the at least one driving-dynamics actual characteristic variable of the tractor vehicle by using a kinematic model depending on geometric characteristic variables of the vehicle combination; and comparing at least one of the at least one driving-dynamics actual characteristic variable of the respective trailer with the at least one driving-dynamics target characteristic variable, which is determined by the kinematic model, of the respective trailer, a presence of unstable behavior of the respective trailer being inferred when the at least one driving-dynamics actual characteristic variable of the respective trailer deviates from the at least one determined driving-dynamics target characteristic variable of the respective trailer by a defined reference value.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 shows a view of a detail of a vehicle combination comprising a drawbar trailer according to FIG. 1a;

DETAILED DESCRIPTION

In an embodiment, the present invention provides a method with which an unstable state or unstable behavior of the trailer can be reliably determined in a simple manner. In an embodiment, the present invention provides a method for the subsequent stabilization, in particular of the trailer, an evaluation unit and a vehicle combination with which or in which the methods can be executed.

Accordingly, it is provided according to the invention that firstly at least one driving-dynamics actual characteristic variable of the trailer is determined, wherein this characterizes the current driving-dynamics state of the trailer and this follows depending on a measurement by means of at least one sensor in the trailer. Here, the driving-dynamics actual characteristic variable follows indirectly or directly from a measurement in the trailer. In this case, a driving-dynamics characteristic variable can also be converted into another driving-dynamics characteristic variable in order to obtain the driving-dynamics state of the trailer. Furthermore, at least one driving-dynamics target characteristic variable of the trailer is determined, wherein this follows from the driving-dynamics actual characteristic variables of the tractor vehicle by using a kinematic model which models the movement of the entire vehicle combination depending on geometric characteristic variables of the vehicle combination starting from the tractor vehicle. Finally, at least one of the driving-dynamics actual characteristic variables of the respective trailer is compared with the at least one driving-dynamics target characteristic variable, which is determined by means of the kinematic model, of the respective trailer in order to determine a deviation in the driving-dynamics trailer behavior from the trailer behavior predicted by means of the kinematic model, wherein the presence of unstable behavior of the respective trailer is inferred when the at least one driving-dynamics actual characteristic variable of the respective trailer deviates from the at least one determined driving-dynamics target characteristic variable of the respective trailer by more than a defined reference value. Therefore, the extent to which the actual state still corresponds to the target state is established.

As a result, it is already possible to achieve the advantage that, for the purpose of determining unstable behavior, use is made of driving-dynamics variables which are actually measured in the trailer. Accordingly, it is possible to detect also those movements of the trailer which are not transferred to the tractor vehicle or are transferred to the tractor vehicle only to a slight extent or too late and accordingly are not being detected or cannot be detected or can only be detected too late by conventional systems which measure and assess only the kinematics of the tractor vehicle.

Furthermore, the target behavior of the trailer which follows in a simple and reliable manner from the actual behavior of the tractor vehicle by means of a kinematic model is also taken into account for the purpose of determining the unstable behavior. To this end, the precise dimensions of the vehicle combination, that is to say the geometric characteristic variables, are advantageously used, these being known in a vehicle combination of which the trailer is equipped with an electronic brake system and has a dedicated CAN bus and being provided via the trailer interface in accordance with ISO 11992 to the CAN bus.

Therefore, the difference between an expected stable driving state of the trailer and an actually present driving state of the trailer can be detected with a high level of accuracy for the currently assembled vehicle combination.

Therefore, the measurement variables or geometric characteristic variables of the vehicle combination which are provided in the vehicle, for example via the CAN bus and the trailer interface, in any case are used. As a result, no further sensors are required and manual parameterization when assembling or changing the vehicle combination, in particular new coupling of a trailer, can also be dispensed with since the geometrical data can be automatically transmitted from the trailer (with an electronic brake system and also a dedicated CAN bus), via the trailer interface, to the CAN bus, for example by means of ISO 11992, and used for the kinematic model. Therefore, the method can be applied in a simple manner to different combinations or else changing vehicle configurations, without reprogramming being required therefor.

In this case, the kinematic model is based on the assumption that the vehicle combination is designed with N members and one of the members is formed by the tractor vehicle and at least one further member is formed by the trailer which is towed by the tractor vehicle indirectly via further members or directly. Using the geometric characteristic variables, the kinematics of the entire N-membered vehicle combination can be determined by means of movement equations and therefore a target state, which is dependent on the kinematics of the tractor vehicle, for the respective trailer can also be extracted in a simple manner.

According to a preferred development, it is provided here that, for comparison purposes, a differential, which is determined in a time-resolved manner, between the at least one driving-dynamics actual characteristic variable of the trailer and the at least one driving-dynamics target characteristic variable of the trailer is calculated. As a result, the deviation can be determined in a time-resolved manner in a simple way and analyzed in order to infer an unstable state.

Here, a trailer target yaw rate and/or a trailer target track offset can preferably be determined as at least one driving-dynamics target characteristic variable of the trailer by means of the kinematic model and a trailer actual yaw rate and/or a trailer actual track offset can preferably be determined as at least one driving-dynamics actual characteristic variable of the trailer, wherein these characteristic variables can each be determined depending on a measurement by means of sensors in the trailer. In this way, actual lateral dynamics of the trailer can be determined, from which unstable behavior can be derived in a simple manner by comparison with the target lateral dynamics. Therefore, it is possible to estimate from a yaw rate deviation whether the trailer yaws more severely than modeled and/or whether its track offset in relation to the tractor vehicle is greater than expected. From this behavior, unstable behavior can be inferred in a simple manner taking into account reference values.

To this end, it is preferably provided that the presence of oscillating behavior of the trailer as unstable behavior is inferred from a temporally oscillating deviation in the trailer actual yaw rate and/or in the trailer actual track offset from the trailer target yaw rate and/or the trailer target track offset with at least one recurring differential yaw rate amplitude as the reference value and/or one differential track offset amplitude as the reference value. In this way, a differential amplitude to be permitted, which is undershot by the respective driving-dynamics actual characteristic variable in the event of stability, is defined as the reference value. However, if the respective driving-dynamics actual characteristic variable deviates by more than this defined amplitude as the reference value repeatedly, for example periodically, destabilizing oscillation behavior of the trailer is inferred.

By way of correspondingly defining the differential amplitude as the reference value, slight or acceptable oscillations which do not necessarily lead to instability can advantageously be permitted. For example, assuming travel on a country road, a recurring deviation in the trailer actual track offset from the trailer target track offset with a maximum track offset of up to 25 cm can be permitted, wherein danger to vehicles in the surrounding area can be avoided up to this deviation. As a result, slight oscillations, for example on account of ruts in the track or on account of measurement and calculation inaccuracies, can be permitted. Instead of a maximum track offset to be permitted, a maximum articulation angle to be permitted can also be defined when the geometric dimensions are known.

According to a preferred development, it can also be provided that sideways swerving of the trailer as unstable behavior is inferred from a one-time deviation in the trailer actual track offset from the trailer target track offset with at least one prespecified limit differential track offset. Therefore, it is also possible to identify in a simple manner from the comparison between the target state and the actual state a driving situation in which one-time sideways swerving of the trailer leads to unstable behavior. Here, the limit differential track offset is preferably greater than the differential track offset amplitude, and therefore a clear distinction between the two unstable driving situations is rendered possible. In addition, it can be expected that sideways swerving requires greater deviations in the track offsets between the tractor vehicle and the trailer in order to achieve an unstable state.

According to a preferred development, it is furthermore provided that the trailer actual yaw rate is determined depending on wheel rotation speeds of the trailer which are measured by means of wheel rotation speed sensors. In addition or as an alternative, the trailer actual yaw rate can be determined depending on a direct measurement of the trailer actual yaw rate by means of a yaw rate sensor in the trailer.

During determination by means of the wheel rotation speeds, use can advantageously be made of the sensors which are present in the trailer in any case, the signals of which are transmitted on the CAN bus into the tractor vehicle via the trailer interface in accordance with ISO 11992 in the case of a trailer with an electronic brake system and also a dedicated CAN bus and are therefore provided. The yaw rate can be estimated in a reliable manner from the wheel rotation speeds. However, in order to save computation complexity, use can also be made of a yaw rate sensor in the trailer, the signals of which can likewise be transmitted on the CAN bus via the trailer interface.

According to a preferred development, it is also provided that the trailer actual track offset follows from an actual total articulation angle between the trailer and the tractor vehicle. Here, the actual total articulation angle can advantageously follow from a sum of actual articulation angles between the members of the vehicle combination, wherein the actual articulation angle is determined depending on wheel rotation speeds of the trailer which are measured by means of wheel rotation speed sensors in the trailer and/or depending on a direct measurement of the trailer actual yaw rate by means of a yaw rate sensor in the trailer and depending on the tractor vehicle actual yaw rate. Therefore, for this determination, use can also be made in a simple manner of actual characteristic variables which are measured in the trailer and in the tractor vehicle in any case, and therefore the actual state of the trailer can be determined in a reliable manner by this means.

The trailer target track offset then preferably follows from a target total articulation angle which is modeled from the driving-dynamics actual characteristic variables of the tractor vehicle by means of the kinematic model, wherein the target total articulation angle follows from a sum of modeled target articulation angles between the members of the vehicle combination. Therefore, a target state can also be estimated in a simple manner by means of the kinematic model in this case in order to derive a driving-dynamics characteristic variable from which unstable behavior can be extracted by the comparison between the actual and the target state.

According to a further preferred embodiment, it is provided that the determination of the at least one driving-dynamics target characteristic variable of the trailer by using the kinematic model and the comparison of the at least one driving-dynamics actual characteristic variable of the respective trailer with the driving-dynamics target characteristic variable of the respective trailer which is determined by means of the kinematic model take place in the tractor vehicle.

As a result, the calculation can advantageously take place in a central position in the vehicle combination at which the required signals can be provided in a simple manner. This is the case, for example, in the controller of the stability system of the tractor vehicle, which controller can access the CAN bus. The relevant data relating to the trailer are transmitted to said CAN bus, and therefore no complicated cable paths or additional controllers need to be provided in the trailer. The method can therefore be executed without a great deal of complexity by way of, for example, an evaluation unit according to the invention, which extends the controller in respect of software and/or in respect of hardware and allows the method according to the invention to be carried out, being formed in the controller. The stability system can then preferably intervene in the driving dynamics of the vehicle combination in order to counter an identified oscillation movement or swerving, wherein the means for this purpose are already present since a stability system can intervene in the driving process in an automated and stabilizing manner and/or is able to output a warning to the driver.

To this end, it is furthermore preferably provided that at least some of the geometric characteristic variables of the vehicle combination are transmitted into the tractor vehicle via a trailer interface, preferably in accordance with ISO 11992. As a result, no further adjustments have to be performed either since the relevant variables are already provided. Processing of this provided data is therefore possible by the method according to the invention without a great deal of complexity.

According to a preferred embodiment, it is furthermore provided for this purpose that the at least one driving-dynamics actual characteristic variable which is measured in the trailer and/or at least some of the geometric characteristic variables of the vehicle combination are/is provided by the trailer interface to a CAN bus in the tractor vehicle. As a result, it is possible to easily supply the relevant variables to the evaluation unit since this merely has to be connected to the CAN bus.

According to a preferred development, it is provided that the driving-dynamics actual characteristic variables of the tractor vehicle follow from a measurement by means of sensors in the tractor vehicle. Therefore, the actual characteristic variables of the tractor vehicle from which the target characteristic variables for the trailer follow by means of the kinematic model are also directly measured in the tractor vehicle and are therefore available to the evaluation unit directly, for example via the CAN bus.

Furthermore, it is preferably provided that a drawbar length of the trailer and/or a wheelbase of the tractor vehicle and/or a wheelbase of the trailer are/is used as geometric characteristic variables of the vehicle combination for the kinematic model. As a result, the geometric design of the vehicle combination can be defined in a simple manner since these variables are responsible for the kinematics of the vehicle combination and the target variables also change depending on said variables for each vehicle combination. Therefore, a very accurate kinematic description of the vehicle combination and therefore accurate determination of the driving-dynamics target state of the trailer can be performed by recourse to these available variables.

According to a preferred development, it is accordingly provided that the driving dynamics of the tractor vehicle which are characterized by the driving-dynamics actual characteristic variables are modeled by the kinematic model onto the respective trailer taking into account the geometric characteristic variables of the vehicle combination. Therefore, the way in which the individual members will respond depending on the geometric dimensions and the movement of the tractor vehicle is calculated in a simple and reliable manner by using the kinematic model, this allowing accurate determination of the target state for the respective vehicle combination.

According to a preferred development, it is provided for this purpose that the use of the kinematic model involves time-resolved successive solution of movement equations for each member of the vehicle combination, wherein each member has a traction point and adjacent members are connected to one another in a rotatable manner via the traction points, wherein a yaw rate of the i-th member of the vehicle combination is estimated by means of the movement equations from the at least one driving-dynamics actual characteristic variable of the tractor vehicle, wherein the at least one driving-dynamics target characteristic variable of the respective trailer is defined depending on the estimated yaw rate of the i-th member of the vehicle combination. Therefore, the movement equations advantageously take into account the driving-dynamics behavior of each individual member, wherein the relative movement in relation to one another is preferably also taken into account in order to be able to model the entire train and the influence of the members on one another.

To this end, the movement equations are preferably dependent on the geometric characteristic variables. In this way, the kinematics of the entire train can be calculated in a simple manner, wherein the current existing dimensions are taken into account for this purpose.

Furthermore, an evaluation unit for carrying out the method according to the invention is provided according to the invention, wherein the evaluation unit is designed to read-in the geometric characteristic variables and the driving-dynamics actual characteristic variables of the tractor vehicle as described and to determine the at least one driving-dynamics target characteristic variable of the respective trailer by means of the kinematic model and to compare them with the at least one driving-dynamics actual characteristic variable of the trailer, and to infer unstable behavior of the respective trailer depending on said comparison. Therefore, the advantages of the method can be ensured by the evaluation unit which can preferably be implemented as software and/or hardware in a controller of the stability system and which is designed to carry out the method.

According to the invention, this evaluation unit is installed in a vehicle combination comprising a tractor vehicle and at least one trailer, wherein at least some of the geometric characteristic variables and the at least one driving-dynamics actual characteristic variable of the trailer which is measured in the trailer can be transmitted via a trailer interface from the trailer to the evaluation apparatus, which is advantageously located in the tractor vehicle, for the purpose of determining unstable behavior of the trailer starting from the tractor vehicle.

Furthermore, a method for stabilizing the trailer is provided according to the invention, wherein at least the following steps are provided:

determining unstable behavior of the at least one trailer in the above-described method according to the invention, and actuating a drive system for reducing the motor torque and/or a brake system and/or a steering system in the tractor vehicle and/or in the trailer when unstable behavior of the at least one trailer is present, for the purpose of stabilizing the trailer, wherein the actuation is performed depending on the determined deviation in the at least one driving-dynamics actual characteristic variable of the respective trailer from the at least one determined driving-dynamics target characteristic variable of the respective trailer, and/or outputting a warning message to the driver.

Therefore, it is possible to respond to the actually present deviation in a targeted manner by way of intervening in a braking manner to achieve the corresponding torque in an automated manner by the stability control system or manually by the driver when he is informed by means of the warning message that an instability is present which he does not notice under certain circumstances since it does not propagate to the tractor vehicle. To this end, it can preferably be provided that the drive system and/or the brake system in the tractor vehicle and/or in the trailer are actuated in such a way that a braking action is increased in the case of a maximum deviation between the actual state and the target state and a braking action is reduced in the case of a minimum deviation. As a result, an oscillating behavior or swerving of the trailer to one side can be damped in a targeted manner.

Figure 1A:
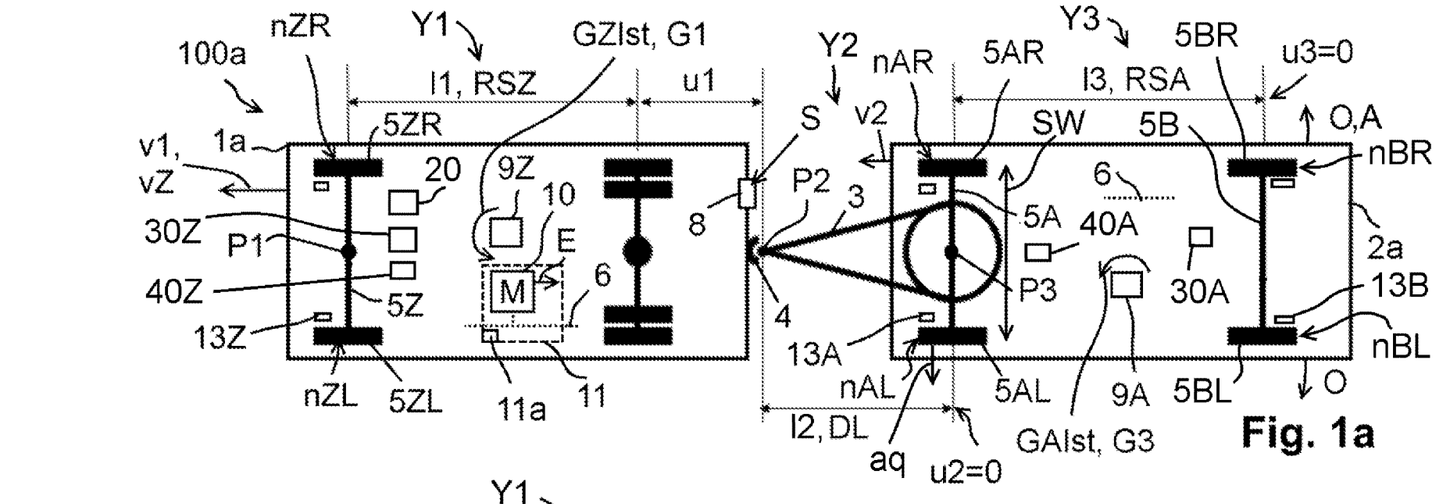
FIGS. 1a, 1b, 1c show different embodiments of a vehicle combination.
Figure 1B:
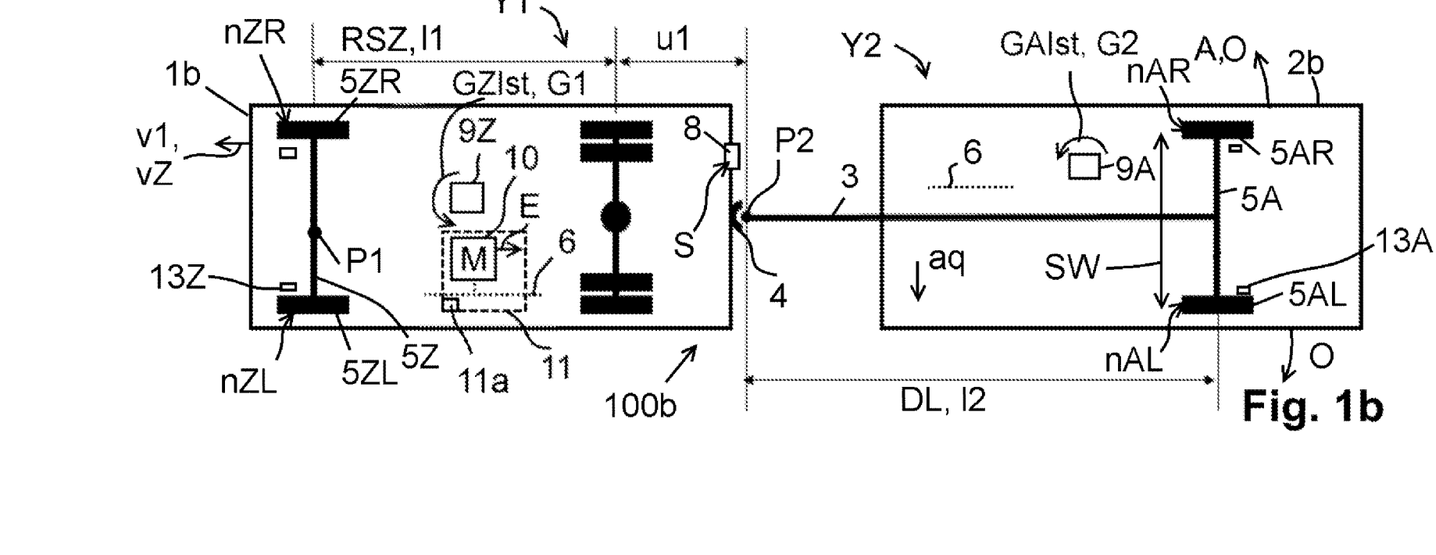
Figures 1C, 2:
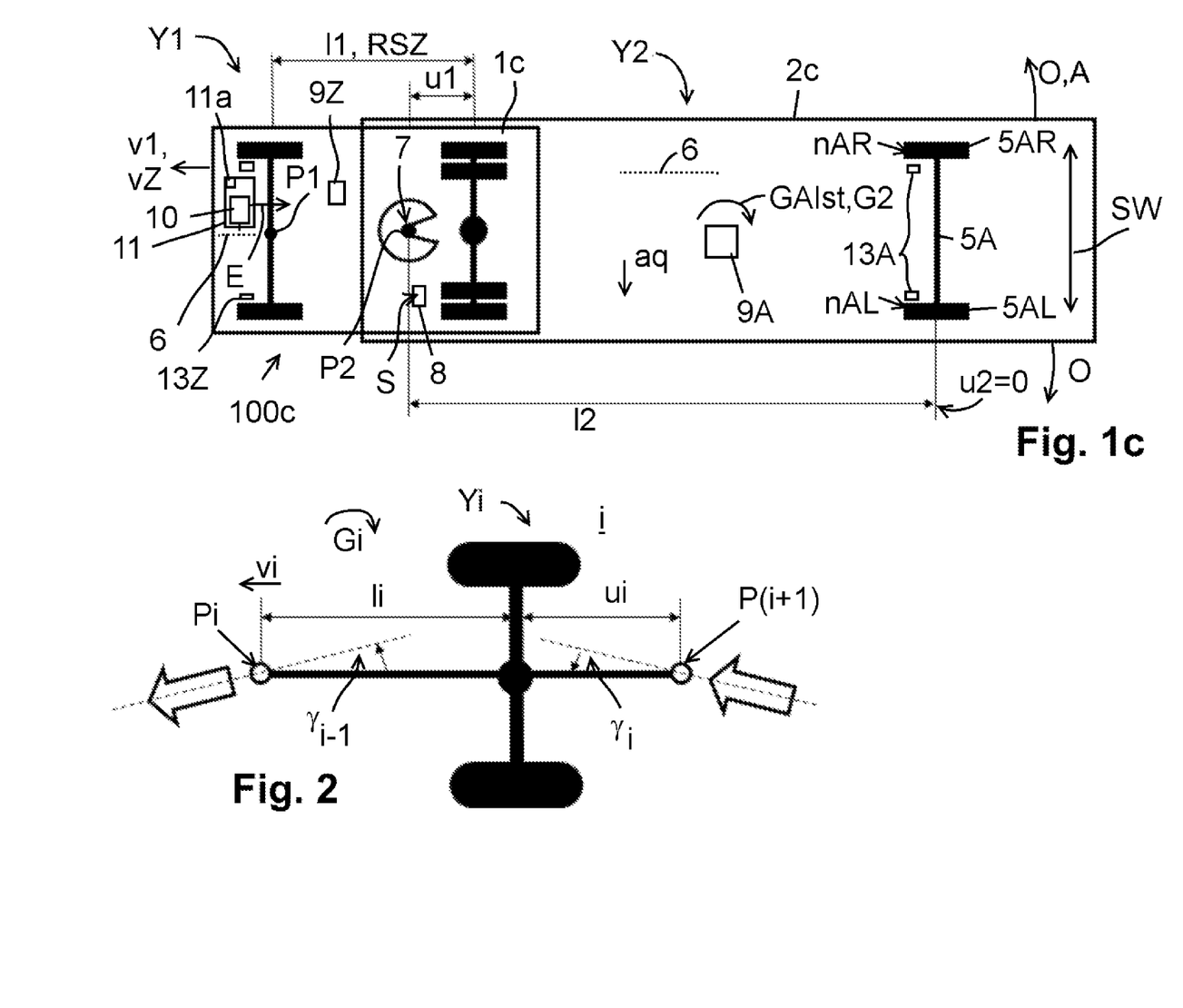
FIG. 2 shows a view of a detail of a front axle of a trailer according to FIGS. 1a, 1b.

FIGS. 1a, 1b and 1c show different embodiments of a vehicle combination 100a, 100b, 100c, in particular utility vehicle combination, wherein the respective vehicle combination 100a, 100b, 100c consists of a tractor vehicle 1a, 1b, 1c (towing vehicle) and a trailer 2a, 2b, 2c (towed vehicle). The vehicle combination in FIG. 1a and FIG. 1b is in each case a road train 100a, 100b comprising a truck 1a, 1b as the tractor vehicle and a drawbar trailer 2a or central axle trailer 2b as the trailer and in FIG. 1c is an articulated vehicle 100c comprising a semitrailer tractor 1c as the tractor vehicle and a semitrailer 2c as the trailer.

In FIGS. 1a and 1b, the drawbar trailer 2a or central axle trailer 2b is connected to the truck 1a, 1b by a drawbar 3 by means of a trailer coupling 4. In the embodiment in FIG. 1a, the drawbar 3 with a drawbar length DL is fixedly connected to a front axle 5A of the drawbar trailer 2a via a fifth wheel, wherein the front axle 5A is mounted in a rotatable manner on the drawbar trailer 2a at a third traction point P3, so that steering of the drawbar trailer 2a is rendered possible. In FIG. 1b, the drawbar 3 is fixedly connected to the non-steerable ("front") axle 5A of the central axle trailer 2b. In FIG. 1c, the semitrailer 2c is pivotably connected in the usual manner to the semitrailer tractor 1c by means of a kingpin 7 at a second traction point P2.

Therefore, a train comprising N members Yi, where i=1, ..., N, is formed in the three vehicle combinations 100a, 100b, 100c illustrated, wherein a three-membered train (Y1: truck 1a—Y2: drawbar 3 with a fifth wheel—Y3: drawbar trailer 2a) is formed in FIG. 1a and a two-membered train (Y1: truck 1b—Y2: central axle trailer 2b or Y1: semitrailer tractor 1c—Y2: semitrailer 2c) is formed in FIGS. 1b and 1c. Here, the number N of members Yi of a vehicle combination 100a, 100b, 100c is defined by a number k of traction points Pi, where i=1, ..., k, and the first traction point P1 is located on the front axle 5Z of the respective tractor vehicle 1a, 1b, 1c as can be seen in the figures. Here, traction points Pi are understood to mean those points on the respective i-th member Yi of the vehicle combination 100a, 100b, 100c by means of which the respective i-th member Yi is towed. For the tractor vehicle 1a, 1b, 1c, it is defined here that said tractor vehicle 1a, 1b, 1c is "towed" at the steerable front axle 5Z since the movement of the tractor vehicle 1a, 1b, 1c is determined by the movement of the steerable front axle 5Z.

In principle, it is also possible for a vehicle combination 100a, 100b, 100c to have more than three members Yi (N>3) because the tractor vehicle 1a, 1b, 1c tows, for example, more than one trailer 2a, 2b, 2c, for example in the case of tractor combinations or in the case of excessively long trucks with several drawbar trailers 2b, 2c and/or dollys or a semitrailer 2c with additionally towed drawbar trailers 2b, 2c and/or with a dolly.

In order to be able to establish unstable behavior IV, for example oscillation behavior O or swerving A to one side, of the respective trailer 2a, 2b, 2c for N-membered vehicle combinations 100a, 100b, 100c of this kind, provision is made to determine a driving-dynamics actual characteristic variable of the respective trailer 2a, 2b, 2c and to compare this with a modeled or estimated driving-dynamics target characteristic variable for the respective trailer 2a, 2b, 2c. Unstable behavior IV, O, A of the respective trailer 2a, 2b, 2c can be inferred on the basis of a comparison result E. This is carried out as follows:

To this end, signals S are firstly exchanged between the trailer 2a, 2b, 2c and the tractor vehicle 1a, 1b, 1c via a trailer interface 8. Here, the signals S contain, in particular, the driving-dynamics actual characteristic variables of the respective trailer 2a, 2b, 2c which are determined in the respective trailer 2a, 2b, 2c or related variables.

Driving-dynamics actual characteristic variables of the trailer 2a, 2b, 2c are understood to be, amongst other things, wheel rotation speeds nAL, nAR of the wheels 5AL, 5AR of the front axle 5A and/or wheel rotation speeds nBL, nBR of the wheels 5BL, 5BR of the rear axle 5B (if present) of the respective trailer 2a, 2b, 2c. However, furthermore, a driving-dynamics actual characteristic variable of the respective trailer 2a, 2b, 2c can also be understood to be a trailer actual yaw rate GAIst which can be measured, for example, by means of a yaw rate sensor 9A in the trailer 2a, 2b, 2c.

However, the trailer actual yaw rate GAIst can also be determined from the wheel rotation speeds nAL, nAR, nBL, nBR of the trailer 2a, 2b, 2c which are measured by means of wheel rotation speed sensors 13A, 13B in the trailer 2a, 2b, 2c and transmitted in any case. To this end, it is assumed that the trailer actual yaw rate GAIst, taking into account corrections, follows from a differential of the wheel rotation speeds nBL, nBR of the wheels 5BL, 5BR of the non-driven, non-braked rear axle 5B of the drawbar trailer 2a or of the wheel rotation speeds nAL, nAR of the wheels 5AL, 5AR of the nondriven, non-braked front axle 5A of the central axle trailer 2b or of the semitrailer 2c since these wheel rotation speeds nAL, nAR, nBL, nBR differ in the event of yawing of the trailer 2a, 2b, 2c. The equation $$GAIst = \frac{2\pi r(nAR, nNBR - nAL, nBL)}{SW}$$

gives the trailer actual yaw rate GAIst in a first approximation when a track width SW and a rolling radius r of the respective wheel 5AR, 5BR, 5AL, 5BL are known. In order to compensate for an induced error in the rolling radius r on account of a lateral acceleration qa acting on the trailer 2a, 2b, 2c during yawing, the trailer actual yaw rate GAIst can be corrected by a linear lateral acceleration-dependent term, and therefore the result is:

$$GAIst, korr = \frac{2\pi r(nAR, nNBR - nAL, nBL)}{SW} - C\,vz\,aq$$

with a constant C which can be empirically or analytically determined in driving experiments for different loads, the measurable vehicle speed vz and the measurable lateral acceleration aq. Owing to determination of the trailer actual yaw rate GAIst in this way, an additional yaw rate sensor 9A in the trailer 2a, 2b, 2c can be dispensed with.

Figure 3:
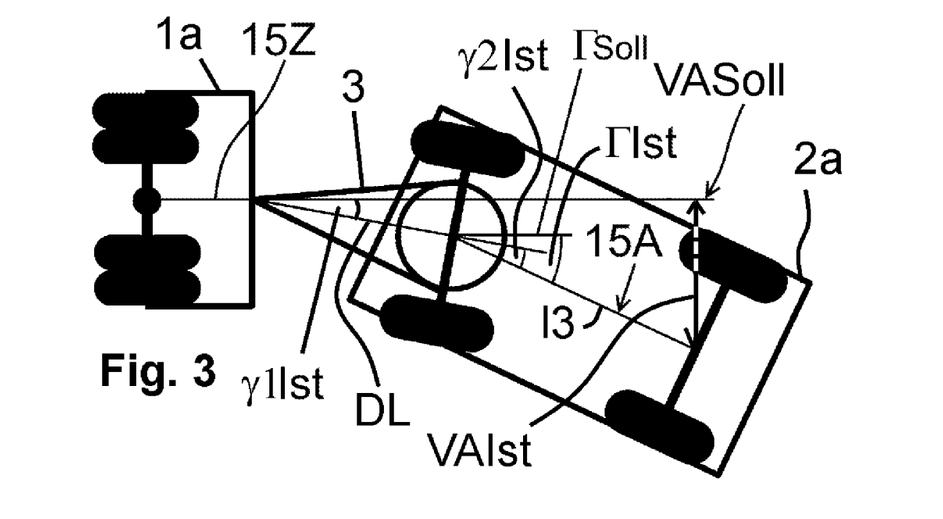

Further driving-dynamics actual characteristic variables of the trailer 2a, 2b, 2c can also be determined from said measurement variables, for example a trailer actual track offset VAIst which indicates the offset of the track of the trailer 2a, 2b, 2c in relation to the track of the tractor vehicle 1a, 1b, 1c (see FIG. 3). Here, the track of the trailer 2a, 2b, 2c is given, for example, by a longitudinal center axis 15A of the trailer 2a, 2b, 2c and the track of the tractor vehicle 1a, 1b, 1c is given by a longitudinal center axis 15Z of the tractor vehicle 1a, 1b, 1c. The trailer actual track offset VAIst can be determined, as described further below, from actual articulation angles γiIst which are present between the individual members Yi and which follow from yaw rates Gi of the individual members Yi.

The signal transmission between the trailer 2a, 2b, 2c and the tractor vehicle 1a, 1b, 1c can be performed, for example, in accordance with ISO 11992 when the respective trailer 2a, 2b, 2c has an electronic brake system and is equipped with a dedicated CAN bus. In accordance with ISO 11992, provision is made to transmit in particular the wheel rotation speeds nAL, nAR, nBL, nBR of the front axle 5A or the rear axle 5B (if present) of the respective trailer 2a, 2b, 2c or a differential of the wheel rotation speeds nAL, nAR, nBL, nBR of an axle 5A, 5B via a trailer interface 8 from the trailer 2a, 2b, 2c to the tractor vehicle 1a, 1b, 1c and therefore to provide them to a CAN bus 6 in the vehicle combination 100a, 100b, 100c. The wheel rotation speeds nZL, nZR of the steerable front axle 5Z of the tractor vehicle 1a, 1b, 1c, which wheel rotation speeds can be measured by means of wheel rotation speed sensors 13Z in the tractor vehicle 1a, 1b, 1c, can also be available via the CAN bus 6 in order to determine therefrom a tractor vehicle actual yaw rate GZIst as the driving-dynamics actual characteristic variable of the tractor vehicle 1a, 1b, 1c.

In order to now be able to infer unstable behavior IV, O, A of the trailer 2a, 2b, 2c from the driving-dynamics actual characteristic variables nAL, nAR, nBL, nBR, GAIst, VAIst of the trailer 2a, 2b, 2c, target driving dynamics for the trailer 2a, 2b, 2c are to be estimated and a deviation between the actual state and the target state is to be detected and assessed depending on the driving-dynamics actual characteristic variable nAL, nAR, nBL, nBR, GAIst, VAIst of the trailer 2a, 2b, 2c. This is performed with recourse to driving-dynamics actual characteristic variables of the tractor vehicle 1a, 1b, 1c and using a kinematic model M. The driving-dynamics actual characteristic variable of the tractor vehicle 1a, 1b, 1c is understood to be, in particular, the tractor vehicle actual yaw rate GZIst and a tractor vehicle speed vZ which are given from the wheel rotation speeds nZR, nZL of the wheels 5ZR, 5ZL of the tractor vehicle 1a, 1b, 1c, as described for the trailer 2a, 2b, 2c, or else are measured directly by means of a yaw rate sensor 9Z, for example of the stability system 11 (ESC), in the tractor vehicle 1a, 1b, 1c or a speed sensor and are provided via the CAN bus 6.

By way of the kinematic model M, the driving dynamics which are expected for the trailer 2a, 2b, 2c when stable driving behavior is present are estimated from the current driving dynamics of the tractor vehicle 1a, 1b, 1c taking into account the geometry of the respective vehicle combination 100a, 100b, 100c. The driving behavior of the tractor vehicle 1a, 1b, 1c is therefore extrapolated to the trailer 2a, 2b, 2c by considering the movement (kinematics), which is assumed to be stable, of the N-membered vehicle combination 100a, 100b, 100c. This is performed with the aid of the following movement equations B1, B2, B3, for which the index i runs from 1 up to the respective number N of members Yi of the respective vehicle combination 100a, 100b, 100c:

$$\gamma_i = \int (G_{i+1} - G_i)dt \tag{B1}$$

$$G_{i+1} = \frac{v_i}{l_{i+1}}\sin(\gamma_i) - G_i\frac{u_i}{l_{i+1}}\cos(\gamma_i) \tag{B2}$$

$$v_{i+1} = v_i\,\cos(\gamma_i) + G_i\,u_i\,\sin(\gamma_i) \tag{B3}$$

In these movement equations B1, B2, B3, γi denotes an articulation angle illustrated between the i-th member Yi and the i+1-th member Y(i+1) in FIG. 2, Gi denotes the yaw rate of the i-th member Yi, vi denotes the speed of the i-th member Yi, li denotes a distance between the traction point Pi of the i-th member Yi and the non-steerable axle of the i-th member Yi and ui denotes a distance between the non-steerable axle of the i-th member Yi and the following traction point P(i+1). If two non-steerable axles are provided, an effective distance ui, li which lies between these two axles is accordingly to be set. In the first movement equation B1, an articulation angle velocity is considered here in order to determine the articulation angle γi (see FIG. 2). Here, the articulation angle velocity follows directly from the differential of the yaw rates Gi between the i-th member Yi and the i+1-th member Y(i+1) and therefore indicates the relative movement between the two members Yi, Y(i+1).

Here, said movement equations B1, B2, B3 apply for the target state and the actual state of the individual members Yi of the respective vehicle combination 100a, 100b, 100c equally. Therefore, both actual values and also target values for the articulation angle γi and/or the respective yaw rate Gi can be calculated when the respective variables are known.

The index i, which relates to the respective member Yi, is defined in the following way in the embodiments of FIGS. 1a, 1b, 1c:

i=1: Y1: tractor vehicle 1a, 1b, 1c (all embodiments);
i=2: Y2: drawbar 3 with a fifth wheel (FIG. 1a), central axle trailer 2b (FIG. 1b), semitrailer 2c (FIG. 1c),
i=3 Y3: drawbar trailer 2a (FIG. 1a)

If the following traction point P(i+1) of the i-th member Yi as illustrated in FIG. 1a for the drawbar 3 with a fifth wheel (i=2) lies on the single axis (5A) of the second member Y2 or there is no following third traction point P3 for the third member Y3, the variables u2 or u3 are equal to zero. Accordingly, the variable u3 is negative in FIG. 1c since the following traction point P2 of the first member Y1 is situated in front of the non-steerable rear axle of the semitrailer 1c.

In the abovementioned movement equations B1, B2, B3, the yaw rate G1 for the first member Y1 (i=1), that is to say for the respective tractor vehicle 1a, 1b, 1c, is known or can be measured as described above by way of the yaw rate sensor 9Z in the tractor vehicle 1a, 1b, 1c as the tractor vehicle actual yaw rate GZIst or can be calculated from the wheel rotation speeds nZR, nZL of the tractor vehicle 1a, 1b, 1c. Furthermore, the speed v1 for the first member Y1 (i=1) is also given by the respective tractor vehicle speed vZ which can be directly measured or can be determined from the wheel rotation speeds nZR, nZL of the tractor vehicle 1a, 1b, 1c. These variables G1 and, respectively, GZIst, v1 therefore constitute measurement variables which can be transmitted as driving-dynamics actual characteristic variables of the tractor vehicle 1a, 1b, 1c, for example via the CAN bus 6, in the above formulae.

However, furthermore, geometric characteristic variables gK of the vehicle combination 100a, 100b, 100c from which the parameters li and ui can be determined for the above-described movement equations B1, B2, B3 are also transmitted via the CAN bus 6. According to FIG. 1a, for example, l1 is the wheelbase RSZ of the tractor vehicle 1a, l2 is the drawbar length DL and l3 is the wheelbase RSA of the drawbar trailer 2a. This applies in a corresponding manner to the central axle trailer 2b and the semitrailer 2c. All of these variables are transmitted, in particular in accordance with ISO 11992, from the trailer 2a, 2b, 2c via the trailer interface 8 to the CAN bus 6 in the tractor vehicle 1a, 1b, 1c, and therefore use can be made of these geometric characteristic variables gK. Here, the wheelbase RSZ of the tractor vehicle 1a, 1b, 1c is stored in a controller 11a of a stability system 11 (ESC) of the tractor vehicle 1a, 1b, 1c. The drawbar length DL and the wheelbase RSA of the drawbar trailer 2a or the drawbar length DL of the central axle trailer 2b and also further geometric characteristic variables gK of the respective vehicle combination 100a, 100b, 100c can be drawn from the respective trailer 2a, 2b, 2c via the trailer interface 8 and can be provided to a central evaluation unit 10 in the tractor vehicle 1a, 1b, 1c via the CAN bus 6, provided that the trailer 2a, 2b, 2c has an electronic brake system with a dedicated CAN bus.

For the variables ui, in FIG. 1a, u1 is equal to the distance between the rear axle of the tractor vehicle 1a and the second traction point P2 or the trailer coupling 4, u2 for the "drawbar member" 3 is zero since the third traction point P3 is situated in the front axle 5A (see above) and u3 is likewise zero since there is no fourth traction point P4. These variables are all known for the respective vehicle combination 100a, 100b, 100c and can therefore be used directly for the calculation.

The variables or distances li and ui in the vehicle combinations 100b and 100c as illustrated in FIGS. 1b and 1c are defined in a comparable manner and can be derived from the data which is transmitted via the CAN bus 6.

Therefore, all parameters are known in the above movement equations B1, B2, B3, and therefore these can be repeatedly calculated for each time step dt. It is assumed in this case that a stable state is present at the beginning of travel or of the calculation and therefore the initial yaw rates Gi for i>1, that is to say the yaw rates of the towed members Yi where i>1, correspond equally to the measurable yaw rate G1, GZIst of the tractor vehicle 1a, 1b, 1c, wherein it is assumed for this purpose that the vehicle combination 100a, 100b, 100c has already moved over a certain distance in a stable manner with certain articulation angles γi between the individual members Yi, and therefore the trailer 2a, 2b, 2c follows the stable travel of the tractor vehicle 1a, 1b, 1c.

Therefore, the movement equations B1, B2, B3 can be successively solved for each time step dt and in this way the yaw rate Gi of the respective i-th member Yi and therefore also of the respective trailer 2a, 2b, 2c can be determined depending on the type of vehicle combination 100a, 100b, 100c or the number N of members Yi in the train. Accordingly, in FIG. 1a, the yaw rate G3 can be determined from the movement equations B1, B2, B3 and, in FIGS. 1b and 1c in each case, the yaw rate G2 can be determined with the respective geometric characteristic variables ui, li for this vehicle combination 100a, 100b, 100c from the above equation in a time-resolved manner.

Figure 4:
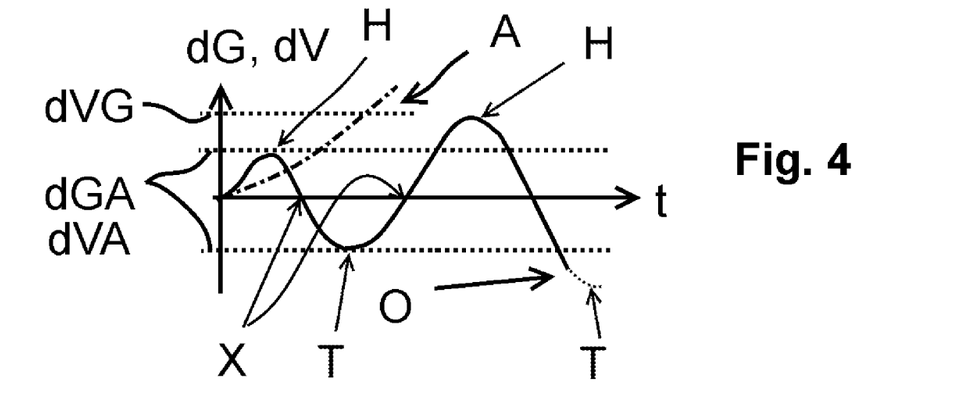
FIG. 4 shows a time profile of a differential yaw rate or of a differential track offset.
Figure 5:
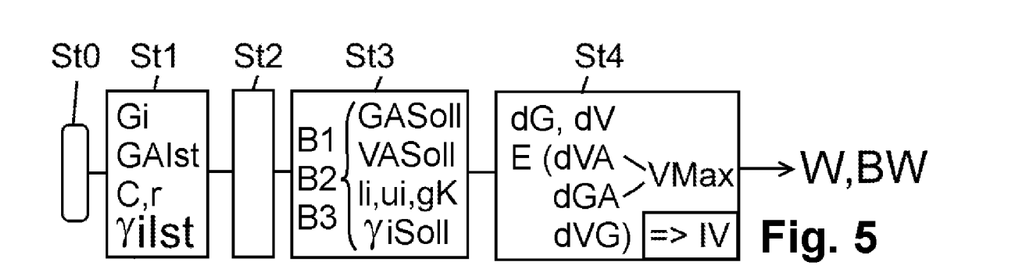
FIG. 5 shows a flowchart of the method according to the invention.

These yaw rates G3 (FIG. 1a) and, respectively, G2 (FIGS. 1b, 1c) which are determined by this means then constitute modeled or estimated trailer target yaw rates GASoll for the respective trailer 2a, 2b, 2c which indicate the target behavior of the trailer 2a, 2b, 2c assuming stable travel. In order to now be able to determine unstable behavior IV, for example oscillation behavior O or one-time sideways swerving A of the trailer 2a, 2b, 2c, in accordance with the original question, the actual state is to be compared with the modeled target state, it being possible for this to be performed in different variants:

In order to determine oscillation behavior O, a differential yaw rate dG=GASoll−GAIst which indicates the deviation in the actual trailer movement from the modeled trailer movement can be calculated in a time-resolved manner in a simple way. If this differential yaw rate dG exhibits temporally oscillating behavior as illustrated in FIG. 4 by way of example, the trailer 2a, 2b, 2c moves relative to the tractor vehicle 1a, 1b, 1c with an oscillating movement, that is to say the trailer 2a, 2b, 2c begins to fishtail. As a comparison result E, the presence of oscillating behavior O of the trailer 2a, 2b, 2c can therefore be inferred when the oscillating differential yaw rate dG repeatedly reaches or overshoots a predetermined differential yaw rate amplitude dGA, and this can be assumed in FIG. 4 for example after the second low point T.

Here, the predetermined differential yaw rate amplitude dGA is preferably selected in such a way that non-critical oscillations are permitted. For example, oscillation or a recurring maximum deviation in the trailer actual yaw rate GAIst from the modeled trailer target yaw rate GASoll can be permitted when as a result a trailer actual track offset VAIst does not deviate by more than a maximum track offset VMax of, for example, 25 cm from a trailer target track offset VASoll assuming travel on a country road.

The determination of the track offsets VAIst, VASoll is explained below with reference to FIG. 3 for the drawbar trailer 2a by way of example. In this case, it is assumed in FIG. 3 that the tractor vehicle 1*a* is moving in a straight line along its longitudinal center axis 15Z, and therefore a trailer target track offset VASoll, that is to say the expected track offset for the trailer 2*a*, lies on this longitudinal center axis 15Z of the tractor vehicle 1*a*. The trailer actual track offset VAIst can be described by the equation $$VAIst = l3 \times \sin(\gamma 1Ist + \gamma 2Ist) + DL \times \sin(\gamma 1Ist)$$

where in each case the current actual values which, as described above, follow from the first movement equation B1 depending on the further driving-dynamics actual characteristic variables nAR, nAL, nBR, nBL, GAIst, GZIst for the drawbar 3, the drawbar trailer 2*a* and the tractor vehicle 1*a* are used for the actual articulation angles γ1Ist, γ2Ist. Here, the sum γ1Ist+γ2Ist corresponds to an actual total articulation angle first between the drawbar trailer 2*a* and the tractor vehicle 1*a*. The trailer target track offset VASoll likewise follows from the formula $$VASoll = l3 \times \sin(\gamma 1Soll + \gamma 2Soll) + DL \times \sin(\gamma 1Soll),$$

where now in each case the modeled target values which follow from the first movement equation B1 by means of the kinematic model M are used for the target articulation angles γ1Soll, γ2Soll. The sum γ1Soll+γ2Soll accordingly indicates in this case a target total articulation angle ΓSoll between the drawbar trailer 2*a* and the tractor vehicle 1*a* which corresponds to zero in the case illustrated in FIG. 3 of travel in a straight line.

Therefore, by means of defining the maximum track offset VMax, non-safety-critical oscillation can be permitted or accepted which can additionally be defined independently of the geometric dimensions of the vehicle combination 100*a*, 100*b*, 100*c* and by way of which danger to the surrounding traffic is avoided since sideways evasion by 25 cm of an approximately 2.5 m-wide vehicle combination in the case of a roadway width of, for example, 3 m is possible, without having an adverse effect, for example, on the oncoming traffic.

However, as an alternative, the trailer actual track offset VAIst as the driving-dynamics actual characteristic variable of the trailer 2*a*, 2*b*, 2*c* can also be used directly for determining oscillation behavior O of the trailer 2*a*, 2*b*, 2*c*. Accordingly, the trailer actual track offset VAIst can be compared with the trailer target track offset VASoll. For the comparison, for example, a differential track offset dV=VASoll−VAIst can be calculated, which indicates the deviation in the actual track offset from the modeled track offset. Therefore, a comparison between an actual state and a target state also takes place here. Oscillation behavior O of the drawbar trailer 2*a* can also be inferred here from a temporally oscillating profile (see FIG. 4) when the oscillating differential track offset dV overshoots a differential track offset amplitude dVA. As when considering the differential yaw rate amplitude dVA, this can take into account the fact that certain oscillation, for example with less than one recurring maximum track offset VMax of the drawbar trailer 2*a* of, for example, 25 cm, is permitted.

In addition or as an alternative, sideways swerving A can also be identified from the differential track offset dV when, for example, it is established one time that the differential track offset Dv overshoots a limit differential track offset dVG. In the event of overshooting of this kind, it can be assumed that the trailer 2*a* is swerving sideways since return to the trailer target track offset VASoll is unlikely if the driving dynamics stay the same.

Therefore, an actual state can be defined in each case by using the driving-dynamics actual characteristic variables of the trailer 2*a*, 2*b*, 2*c* and said actual state can be compared with a target state which is modeled from the movement of the tractor vehicle 1*a*, 1*b*, 1*c*. This is done by means of the movement equations B1, B2, B3 depending on a relative movement between the individual members Yi of the train, whereby the temporal behavior of the train can be monitored and an unstable state can be inferred therefrom.

In principle, the above considerations and movement equations B1, B2, B3 can also be carried out depending on the lateral acceleration instead of the yaw rate, by means of which the lateral dynamics of the trailer 2*a*, 2*b*, 2*c* can also be described. However, a more reliable statement about the stability of the trailer can be made from the yaw rate.

The calculations and comparisons just described can be carried out centrally, for example, in an evaluation unit 10 in the respective tractor vehicle 1*a*, 1*b*, 1*c*, which evaluation unit has access to the CAN bus 6. The evaluation unit 10 can be, for example, part of the controller 11*a* of the stability system 11 (ESC) in the tractor vehicle 1*a*, 1*b*, 1*c*, and therefore the function of the stability system 11 is extended. This can be performed by hardware and/or software adjustment by way of which recourse to the signals S which are transmitted via the trailer interface 8 in accordance with ISO 11992 and to the additional inclusion of said signals in the evaluation according to the above-described method is rendered possible. Therefore, the evaluation unit 10 is implemented using software and/or hardware.

As part of the stability system 11 in the tractor vehicle 1*a*, 1*b*, 1*c*, the evaluation unit 10 is accordingly designed to assess the stability of the vehicle combination 100*a*, 100*b*, 100*c*. To this end, the variables or distances ui and li are determined from the geometric characteristic variables gK, RSZ, RSA, DL, . . . which are read-in via the CAN bus 6, and with the transmitted or determined driving-dynamics actual characteristic variables nAL, nAR, nBL, nBR, GAIst, VAIst of the trailer 2*a*, 2*b*, 2*c* and the measured driving-dynamics actual characteristic variables nZR, nZL, GZIst, vZ of the tractor vehicle 1*a*, 1*b*, 1*c* the comparison result E is determined by means of the kinematic model M; E indicating whether there is a deviation of the actual state from the target state for the trailer 2*a*, 2*b*, 2*c* and whether this deviation leads to unstable behavior IV, O, A of the trailer 2*a*, 2*b*, 2*c*.

Depending on the comparison result E or the determined oscillation behavior O or the sideways swerving A of the trailer 2*a*, 2*b*, 2*c*, a corresponding action can then be carried out as part of an assistance function. This can be performed, for example, in the form of a warning signal W to the driver, so that said driver can intervene manually by way of a steering maneuver and/or a braking maneuver and/or a drive maneuver, for example reduction in the motor torque. As an alternative or in addition, automated control commands can also be output by the evaluation unit 10 or the controller 11*a* to a drive system 20 and/or a brake system 30A, 30Z and/or a steering system 40A, 40Z of the tractor vehicle 1*a*, 1*b*, 1*c* and/or of the trailer 2*a*, 2*b*, 2*c*, so that intervention can take place in an automated manner in order to counteract the oscillation behavior O or the sideways swerving A. For reasons of clarity, the drive system 20, the brake system 30A, 30Z and the steering system 40A, 40Z are illustrated only for the vehicle combination 100*a* in FIG. 1*a*. However, these can also be provided in a corresponding manner in FIG. 1*b* and FIG. 1*c*.

The automated intervention can be performed, for example, by way of the evaluation unit 10 and/or the controller 11*a* actuating the drive system 20 to reduce the motor torque and/or actuating the brake system 30A, 30Z to implement braking in such a way that the vehicle combination 100a, 100b, 100c is braked in a pulsed manner. As a result, when oscillation behavior O is present, pulsed anti jackknife braking can be implemented, by way of which the train can be stretched in a targeted manner and the oscillations can therefore be reduced. Here, it can be provided that the pulsed braking intervention by means of the drive system 20 and/or the brake system 30A, 30Z is performed depending on the currently present differential yaw rate dG and/or the differential track offset dV by means of closed-loop control. For example, a braking action BW by means of the drive system 20 and/or the brake system 30A, 30Z can always be amplified when the differential yaw rate dG and/or the differential track offset dV approach a high point H or a low point T, whereas a reduction in the braking action BW by means of the drive system 20 and/or the brake system 30A, 30Z is performed when the differential yaw rate dG and/or the differential track offset dV approach a zero crossing X. As a result, the oscillation behavior O can be efficiently damped. In the case of sideways swerving A to one side too, intervention can be performed in a targeted manner with closed-loop control when the differential track offset dV approaches the predetermined limit differential track offset dVG in order to counteract said sideways swerving to one side.

According to the invention, provision is made, according to FIG. 3, for example to determine, after an initialization step St0, the driving-dynamics actual characteristic variables nAL, nAR, nBL, nBR, GAIst (C, r), VAIst of the trailer 2a, 2b, 2c as described above in a first step St1 in a time-resolved manner, wherein these characterize the current driving-dynamics state of the trailer 2a, 2b, 2c. Here, the trailer actual track offset VAIst follows from the measured or determined actual values of the yaw rates Gi for each member Yi of the vehicle combination 100a, 100b, 100c and the determined actual articulation angles γiIst between the respective members Yi.

Subsequently, in a second step St2, the driving-dynamics actual characteristic variables nZL, nZR, GZIst, vZ of the tractor vehicle 1a, 1b, 1c are determined and, in a third step St3, a driving-dynamics target characteristic variable GASoll, VZSoll for the trailer 2a, 2b, 2c is modeled or determined from these taking into account the kinematic model M as described by means of the movement equations B1, B2, B3, wherein this is performed taking into account the geometric characteristic variables gK, RSA, RSZ, DL of the vehicle combination 100a, 100b, 100c from which the distances ui, li follow. Here, target values for the yaw rates Gi and target articulation angles γiSoll for the respective members Yi are determined from the kinematic model M.

In a fourth step St4, a comparison between the driving-dynamics actual characteristic variable, preferably the trailer actual yaw rate GAIst and/or the trailer actual track offset VAIst, and the driving-dynamics target characteristic variable, preferably the trailer target yaw rate GASoll and/or the trailer target track offset VASoll, is carried out by way of, for example, a differential yaw rate dG or a differential track offset dV being calculated. As a result, the deviation between the behavior modeled by the tractor vehicle 1a, 1b, 1c onto the respective trailer 2a, 2b, 2c and the actual behavior of the respective trailer 2a, 2b, 2c can be determined. In the case of a temporally oscillating deviation or a temporally oscillating differential dG, dV with at least one defined differential amplitude dVA, dGA, oscillation behavior O is inferred as the comparison result E and in the case of a limit differential track offset dVG being overshot, sideways swerving A of the trailer 2a, 2b, 2c is inferred. Here, the differential amplitudes dVA, dGA can be defined taking into account a maximum track offset VMax to be permitted between the tractor vehicle 1a, 1b, 1c and the respective trailer 2a, 2b, 2c.

In the case of any unstable behavior IV, O, A, a warning message W can then be output in a corresponding manner in order to implement manual intervention and/or intervention in the driving operation can also be implemented in an automated manner in order to counteract the unstable behavior IV, O, A, for example by adjusting a braking action BW in a targeted manner by actuating the drive system 20 to reduce the motor torque and/or actuating the brake system 30A, 30Z to implement braking.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

1a, 1b Truck (tractor vehicle of 100a, 100b)
1c Semitrailer tractor (tractor vehicle of 100c)
2a Drawbar trailer
2b Central axle trailer
2c Semitrailer
3 Drawbar with fifth wheel
4 Trailer coupling
5A Front axle of the trailer
5AL Left wheel of the front axle 5A
5AR Right wheel of the front axle 5A
5B Rear axle of the trailer
5BL Left wheel of the rear axle 5B
5BR Right wheel of the rear axle 5B
5Z Front axle of the tractor vehicle
5ZL Left wheel of the front axle 5Z
5ZR Right wheel of the front axle 5Z
6 CAN bus
7 Kingpin
8 Trailer interface
9Z Yaw rate sensor in the tractor vehicle 9A Yaw rate sensor in the trailer
10 Evaluation unit
11 Stability system (ESC)
11a Controller of the stability system
13A, 13B Wheel rotation speed sensors in the trailer
13Z Wheel rotation speed sensors in the tractor vehicle
15A Longitudinal center axis of the trailer
15B Longitudinal center axis of the tractor vehicle
20 Drive
30A Brake system of the trailer
30Z Brake system of the tractor vehicle
40A Steering system of the trailer
40Z Steering system of the tractor vehicle
100a, 100b Road train
100c Articulated vehicle
A Sideways swerving
aq Lateral acceleration
B1 First movement equation
B2 Second movement equation
B3 Third movement equation
BW Braking action
C Constant
dt Time step
dGA Differential yaw rate amplitude
dG Differential yaw rate
dVA Differential track offset amplitude
dV Differential track offset
dVG Limit differential track offset
DL Drawbar length
E Comparison result
F Amplitude
☐i i-th articulation angle
☐iIst i-th actual articulation angle
☐iSoll i-th target articulation angle
☐Ist Actual total articulation angle
☐Soll Target total articulation angle
GAIst Trailer actual yaw rate
GASoll Trailer target yaw rate
GZIst Tractor vehicle actual yaw rate
Gi Yaw rate of the i-th member Yi
gK Geometric characteristic variable
H High point
Index
IV Unstable behavior
k Number of traction points
li ui Distances
M Kinematic model
N Number of members Yi
nAL, nAR Wheel rotation speeds at the front axle 5A of the trailer
nBL, nBR Wheel rotation speeds at the rear axle 5A of the trailer
nZL, nZR Wheel rotation speeds at the tractor vehicle
O Oscillation behavior
Pi Traction point i
r Rolling radius of the wheel
RSZ Wheelbase of the tractor vehicle 1a, 1b, 1c
RSA Wheelbase of the trailer 1a, 1b, 1c
S Signal
SW Track width
T Low point
vi Speed of the i-th member Yi
VAIst Trailer actual track offset
VASoll Trailer target track offset
VMax Maximum track offset
vZ Tractor vehicle speed
W Warning message
X Zero crossing
Y.i i-th member
Y1 First member
Y2 Second member
Y3 Third member
St0, St1, St2, St3, St4 Steps of the method What claimed is:

1. A method for determining unstable behavior of a trailer of a vehicle combination, the vehicle combination having N members, one of the members comprising a tractor vehicle and at least one further member comprising the trailer, the unstable behavior of the trailer being determined depending on a driving-dynamics actual characteristic variable of the tractor vehicle, the method comprising:
determining at least one driving-dynamics actual characteristic variable of the trailer, the at least one driving-dynamics actual characteristic variable characterizing a current driving-dynamics state of the trailer and following from a measurement by at least one sensor in the trailer;
determining at least one driving-dynamics target characteristic variable of the trailer, the at least one driving-dynamics target characteristic variable following from the at least one driving-dynamics actual characteristic variable of the tractor vehicle by using a kinematic model depending on geometric characteristic variables of the vehicle combination; and
comparing at least one of the at least one driving-dynamics actual characteristic variable of the respective trailer with the at least one driving-dynamics target characteristic variable, which is determined by the kinematic model, of the respective trailer, a presence of unstable behavior of the respective trailer being inferred when the at least one driving-dynamics actual characteristic variable of the respective trailer deviates from the at least one determined driving-dynamics target characteristic variable of the respective trailer by a defined reference value.

2. The method of claim 1, wherein, for comparison purposes, a differential between the at least one driving-dynamics actual characteristic variable of the trailer and the at least one driving-dynamics target characteristic variable of the trailer is calculated.

3. The method of claim 1, wherein a trailer target yaw rate and/or a trailer target track offset are/is determined as at least one driving-dynamics target characteristic variable of the trailer by the kinematic model and a trailer actual yaw rate and/or a trailer actual track offset are/is determined as at least one driving-dynamics actual characteristic variable of the trailer in each case depending on a measurement by sensors in the trailer.

4. The method of claim 3, wherein a presence of oscillating behavior of the trailer as unstable behavior is inferred from a temporally oscillating deviation in the trailer actual yaw rate and/or in the trailer actual track offset from the trailer target yaw rate and/or the trailer target track offset with at least one recurring differential yaw rate amplitude and/or one differential track offset amplitude.

5. The method of claim 4, wherein a maximum track offset to be permitted of 25 cm is used to define the differential yaw rate amplitude and/or a differential track offset amplitude.

6. The method of claim 3, wherein sideways swerving of the trailer as unstable behavior is inferred from a trailer actual track offset which deviates one time from the trailer target track offset with at least one prespecified limit differential track offset.

7. The method of claim 3, wherein the trailer actual yaw rate is determined depending on wheel rotation speeds of the trailer which are measured by wheel rotation speed sensors in the trailer and/or depending on a direct measurement of the trailer actual yaw rate by a yaw rate sensor in the trailer.

8. The method of claim 7, wherein the wheel rotation speeds which are measured in the trailer and/or the trailer actual yaw rate which is measured directly in the trailer are/is transmitted into the tractor vehicle via a trailer interface and are/is provided from the trailer interface to a CAN bus in the tractor vehicle.

9. The method of claim 3, wherein the trailer actual track offset follows from an actual total articulation angle between the trailer and the tractor vehicle.

10. The method of claim 9, wherein the actual total articulation angle follows from a sum of actual articulation angles between the members of the vehicle combination, and wherein the actual articulation angle is determined depending on wheel rotation speeds of the trailer which are measured by wheel rotation speed sensors in the trailer and/or depending on a direct measurement of the trailer actual yaw rate by a yaw rate sensor in the trailer and depending on the tractor vehicle actual yaw rate.

11. The method of claim 3, wherein the trailer target track offset follows from a target total articulation angle which is modeled from the at least one driving-dynamics actual characteristic variable of the tractor vehicle by the kinematic model, and wherein the target total articulation angle follows from a sum of modeled target articulation angles between the members of the vehicle combination.

12. The method of claim 1, wherein the determination of the at least one driving-dynamics target characteristic variable of the trailer by using the kinematic model and the comparison of the at least one driving-dynamics actual characteristic variable of the respective trailer with the at least one driving-dynamics target characteristic variable of the respective trailer which is determined by the kinematic model takes place in the tractor vehicle.

13. The method of claim 12, wherein at least some of the geometric characteristic variables of the vehicle combination are transmitted into the tractor vehicle via a trailer interface and are provided from the trailer interface to a CAN bus in the tractor vehicle.

14. The method of claim 1, wherein a drawbar length of the trailer and/or a wheelbase of the tractor vehicle and/or a wheelbase of the trailer are/is used as geometric characteristic variables of the vehicle combination for the kinematic model.

15. The method of claim 1, wherein the driving dynamics of the tractor vehicle which are characterized by the at least one driving-dynamics actual characteristic variable are modeled by the kinematic model onto the respective trailer taking into account the geometric characteristic variables of the vehicle combination.

16. The method of claim 1, wherein the use of the kinematic model involves time-resolved successive solution of movement equations for each member of the vehicle combination, wherein each member has a traction point and adjacent members are connected to one another in a rotatable manner via the traction points, wherein a yaw rate is estimated by the movement equations from the at least one driving-dynamics actual characteristic variable of the tractor vehicle for each member of the vehicle combination and the at least one driving-dynamics target characteristic variable of the respective trailer is defined depending on the estimated yaw rates of the members of the vehicle combination.

17. The method of claim 16, wherein the movement equations are dependent on the geometric characteristic variables.

18. An evaluation unit for carrying out the method of claim 1, wherein the evaluation unit is configured to read in the geometric characteristic variables and the at least one driving-dynamics actual characteristic variable of the tractor vehicle and to determine the at least one driving-dynamics target characteristic variable of the respective trailer by the kinematic model and to compare them with the at least one driving-dynamics actual characteristic variable of the trailer, and to infer unstable behavior of the respective trailer depending on the comparison.

19. The evaluation unit of claim 18, wherein the evaluation unit is arranged in the tractor vehicle.

20. A vehicle combination, comprising:
the tractor vehicle; and
at least one trailer having the evaluation apparatus of claim 18.

21. The vehicle combination of claim 20, wherein at least some of the geometric characteristic variables and at least one driving-dynamics actual characteristic variable of the trailer which is measured in the trailer is transmittable via a trailer interface from the trailer to the evaluation apparatus in the tractor vehicle to determine unstable behavior of the trailer starting from the tractor vehicle.

22. A method for stabilizing a trailer of a vehicle combination comprising a tractor vehicle and at least one trailer having an evaluation unit for carrying out the method of claim 1, wherein the evaluation unit is configured to read in the geometric characteristic variables and the at least one driving-dynamics actual characteristic variable of the tractor vehicle and to determine the at least one driving-dynamics target characteristic variable of the respective trailer by the kinematic model and to compare them with the at least one driving-dynamics actual characteristic variable of the trailer, and to infer unstable behavior of the respective trailer depending on the comparison, the vehicle combination having N members, the method comprising:

determining unstable behavior of the at least one trailer using the method of claim 1; and actuating a drive system and/or a brake system and/or a steering system in the tractor vehicle and/or in the trailer when unstable behavior of the at least one trailer is present in order to stabilize the trailer, the actuating being performed depending on a determined deviation in the at least one driving-dynamics actual characteristic variable of the respective trailer from the at least one determined driving-dynamics target characteristic variable of the respective trailer, or outputting a warning message to the driver to trigger manual intervention by the drive system and/or the brake system and/or the steering system in the tractor vehicle and/or in the trailer.

23. The method of claim 22, wherein the drive system and/or the brake system in the tractor vehicle and/or in the trailer are actuated such that a braking action is increased upon a maximum deviation in the at least one driving-dynamics actual characteristic variable from the at least one driving-dynamics target characteristic variable and a braking action is reduced in upon a minimum deviation.

24. The method of claim 8, wherein the wheel rotation speeds which are measured in the trailer and/or the trailer actual yaw rate which is measured directly in the trailer are/is transmitted into the tractor vehicle via the trailer interface in accordance with ISO 11992.

25. The method of claim 13, wherein at least some of the geometric characteristic variables of the vehicle combination are transmitted into the tractor vehicle via the trailer interface in accordance with ISO 11992.

26. The evaluation unit of claim 19, wherein the evaluation unit is arranged in a controller of a stability system of the tractor vehicle.

\* \* \* \* \*